United States Patent [19]

Van Schoiack

[11] 4,125,789
[45] Nov. 14, 1978

[54] BIASING AND SCALING CIRCUIT FOR TRANSDUCERS

[75] Inventor: Michael M. Van Schoiack, Bellevue, Wash.

[73] Assignee: Sundstrand Corporation, Rockford, Ill.

[21] Appl. No.: 804,419

[22] Filed: Jun. 7, 1977

[51] Int. Cl.² ............................................. H03K 17/00
[52] U.S. Cl. ................................ 307/296 R; 307/229; 307/230; 307/297
[58] Field of Search .................... 307/229, 230, 296 R, 307/297; 330/260, 261

[56] References Cited

U.S. PATENT DOCUMENTS

| | | | |
|---|---|---|---|
| 3,504,267 | 3/1970 | James et al. | 307/229 |
| 3,839,647 | 10/1974 | Simmons | 307/229 |
| 3,870,906 | 3/1975 | Hughes | 307/297 |

Primary Examiner—Stanley D. Miller, Jr.
Assistant Examiner—B. P. Davis
Attorney, Agent, or Firm—Ted E. Killingsworth; Michael B. McMurry; William R. Peoples

[57] ABSTRACT

In order to provide a substantially error free biasing and scaling circuit for transducer signals, an operational amplifier and a field effect transistor are used in combination with a DC voltage source to bias and scale the transducer signal.

5 Claims, 2 Drawing Figures

BIASING AND SCALING CIRCUIT FOR TRANSDUCERS

BACKGROUND OF THE INVENTION

The invention relates to the field of signal biasing and scaling circuits and more particularly scaling and biasing circuits for use with small signal transducers.

Since transducers, such as accelerometers, used in telemetry systems generally have small signal outputs that are of both a positive and negative polarity, it is quite often necessary to convert those outputs to signals of a single polarity due to the fact that many of the telemetry systems require that the input signals be of a single polarity and of a limited voltage range such as 0 to 5 volts DC. Also due to the fact that telemetry systems often require signals of great accuracy, it is highly desirable that any biasing or scaling circuits introduce an absolute minimum of error into the signals. In addition, many of the prior art biasing and scaling circuits used with telemetry systems require a negative source of DC voltage which in many cases is not available within the telemetry system itself.

In other prior art systems utilizing positive voltage sources in combination with transistor elements, quite often errors are introduced into the signal output due to temperature effects on the transistors or result from the base currents in the transistors themselves. In addition the current voltage characteristics of the transistor elements tended to vary with temperature thereby adding an additional source of error.

SUMMARY OF THE INVENTION

It is therefore an object of the invention to provide a scaling and biasing circuit utilizing an operational amplifier and field effect transistor in combination with a positive DC voltage source.

It is additional object of the invention to provide a biasing and scaling circuit for use with transducer signals including: a positive DC voltage source wherein the voltage source is connected by means of a zener diode to one terminal of an operational amplifier, the other terminal of the operational amplifier connected by means of a bias resistor to the voltage source and to the transducer by means of a scaling resistor, a field effect transistor having its gate connected to the output of the operational amplifier and source and drain connected between the positive terminal of the operational amplifier and a load resistor.

DETAILED DESCRIPTION OF THE INVENTION

Figure 1:
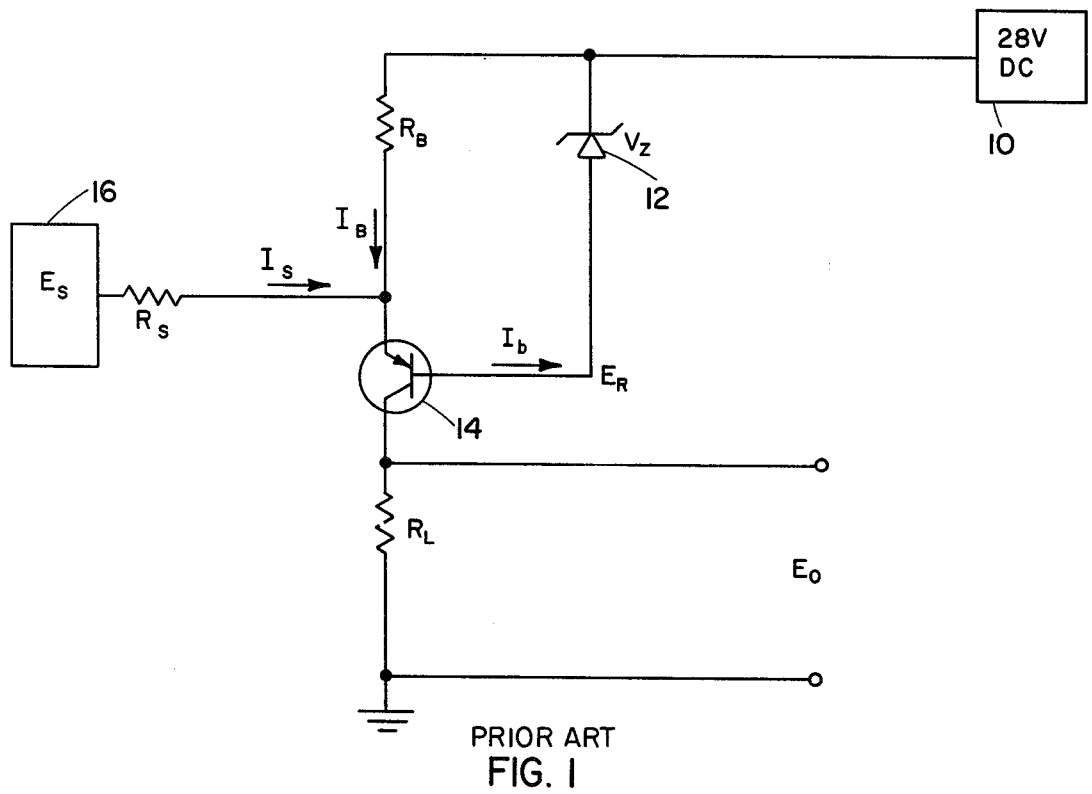
FIG. 1 is a schematic drawing of a prior art bias and scaling circuit.

Illustrated in FIG. 1 of the drawings is a typical example of a prior art biasing and scaling circuit. A 28-volt DC source 10 is connected by means of a zener diode 12 to the base of a PNP transistor 14. A bias resistor $R_B$ is connected between the voltage source 10 and the emitter of transistor 14 and a scaling resistor $R_s$ is also connected between the emitter of transistor 14 and a transducer signal source 16. The collector of transistor 14 is connected to a load resistor $R_L$ across which a biased and scaled output signal $E_o$ is generated.

In normal operation the PNP transistor 14 serves as a feedback element to adjust the bias current $I_B$ flowing through $R_b$ in response to the transducer 16 input signal $E_s$ so that the correct bias and scaling currents are applied to the load resistor $R_L$.

The above described arrangement in FIG. 1, unfortunately, often results in certain errors in the output signal $E_o$. For example, since there is an appreciable base current $I_b$, not all of the current being applied to the emitter of the transistor 14 will flow through the load resistor $R_L$. In addition, the voltage at the emitter of transistor 14 can vary as a function of the base to emitter voltage of transistor 14 which in turn may vary with temperature thereby introducing significant errors into the output signal $E_o$.

Figure 2:
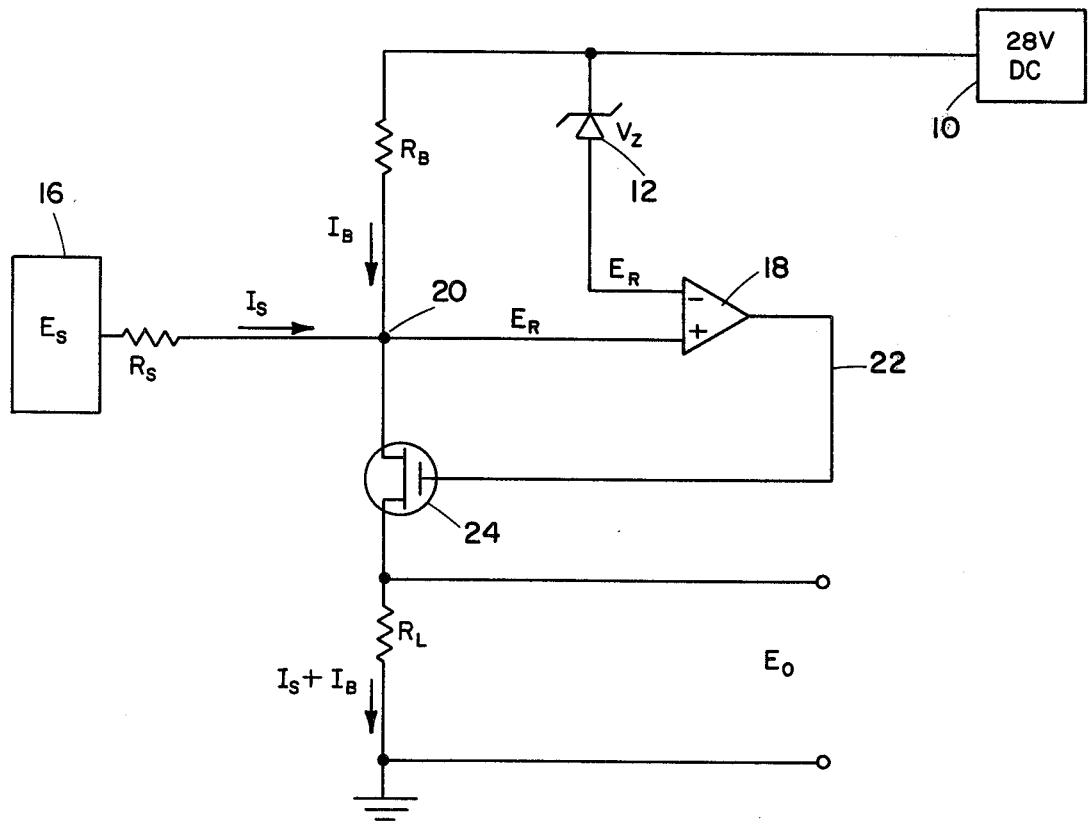
FIG. 2 is a schematic drawing of a bias and scaling circuit.

In order to overcome these difficulties, the biasing and scaling circuit of FIG. 2 was developed. As in the case of the circuit of FIG. 1 a 28-volt DC voltage source 10 is utilized to provide a positive source of bias current and voltage. However, as shown in FIG. 2, the anode of zener diode 12 is connected to a negative terminal of an operation amplifier 18. A positive terminal of operational amplifier 18 is connected through current summing junction 20 and biasing resistor $R_B$ to the voltage source 10. Similarly, transducer signal source 16 is connected through scaling resistor $R_s$ to the current summing junction 20. Connected to the output of the operational amplifier 18 on line 22 is the gate of a N-channel field effect transistor 24. The source and drain terminals of the field effect transistor 24 are then connected between the summing junction 20 and load resistor $R_1$.

In normal operation the operational amplifier 18 will cooperate with field effect transistor 24 to provide a negative feedback loop in response to signal inputs $E_s$ from transducer 16 so that the appropriate biasing current $I_B$ and scaling current $I_s$ will flow through load resistor $R_L$ to provide an accurate single polarity signal $E_o$ that represents $E_s$. For example if the signal voltage $E_s$ should increase, the operational amplifier 18 will generate a positive output on line 22 thereby permitting increased current to flow through field effect transistor 24. The bias current $I_B$ will increase so as to maintain the voltage drop across the biasing resistor $R_B$ equal the voltage drop $V_z$ across the zener diode 12. Thus, the operational amplifier 18 in combination with field effect transistor 24 will act as a negative servo loop maintaining the correct value of the biasing current $I_B$. The operation of the circuit of FIG. 2 may be represented by the equation:

$$E_o = \frac{R_L}{R_S}(E_S - E_R) + \frac{R_L}{R_B}V_z \qquad (1)$$

In the above equation (1) the quantity $E_r$ is the voltage at the negative terminal of the operational amplifier 18. In the circuit of FIG. 2 the scale factor may be represented by $R_L/R_s$ and the biasing factor by $R_L/R_b \times V_z$. It should also be noted at this point that a P-channel field effect transistor could be used in place of the N-channel field effect transistor 24 if the polarity of the inputs of operational amplifier 18 were reversed.

The scaling and biasing circuit shown in FIG. 2 has a very significant advantage over the circuit shown in FIG. 1 in that due to the fact that field effect transistors are very high impedance circuit elements there will be no appreciable current flowing in line 22. This will result in a negligible diversion of current from the load resistor $R_L$ thereby enhancing the accuracy of the biasing and scaling circuit.

I claim:

1. A bias and scaling circuit for use with a source of signals from a transducer or the like comprising:
   a voltage source;
   an operational amplifier having a first and a second input terminal and an output terminal;
   a diode connected between said voltage source and said first operational amplifier input terminal;
   a current summing junction connected to said second operational amplifier input;
   a bias resistor connected between said voltage source and said current summing junction;
   a scaling resistor connected between the signal source and said current summing junction;
   a field effect transistor having a gate terminal connected to said operational amplifier output terminal and an input terminal connected to said current summing junction; and
   a load resistor connected to an output terminal of said field effect transistor.

2. The circuit of claim 1 wherein said voltage source is a source of positive direct current.

3. The circuit of claim 1 wherein said diode is a zener diode.

4. The circuit of claim 2 wherein:
   said first operation amplifier input terminal is a negative terminal; and
   said second operational amplifier input terminal is a positive terminal.

5. The circuit of claim 4 wherein said field effect transistor is an N-channel field effect transistor.

* * * * *

UNITED STATES PATENT AND TRADEMARK OFFICE
CERTIFICATE OF CORRECTION

PATENT NO. : 4,125,789
DATED : November 14, 1978
INVENTOR(S) : Michael M. Van Schoiack It is certified that error appears in the above–identified patent and that said Letters Patent are hereby corrected as shown below:

The assignee of the above-identified U.S. Patent should be Sundstrand Data Control, Inc. rather than Sundstrand Corporation.

Signed and Sealed this

Thirteenth Day of March 1979

[SEAL]

Attest:

RUTH C. MASON
*Attesting Officer*

DONALD W. BANNER
*Commissioner of Patents and Trademarks*